United States Patent [19]

Haddow

[11] Patent Number: 5,599,519
[45] Date of Patent: Feb. 4, 1997

[54] OXIDATION OF TITANIUM TETRACHLORIDE TO FORM TITANIUM DIOXIDE

[75] Inventor: Andrew J. Haddow, Cleveland, England

[73] Assignee: Tioxide Group Services Limited, London, England

[21] Appl. No.: 412,228

[22] Filed: Mar. 27, 1995

Related U.S. Application Data

[63] Continuation of Ser. No. 102,791, Aug. 6, 1993, abandoned.

[30] Foreign Application Priority Data

Aug. 10, 1992 [GB] United Kingdom .................. 9216933

[51] Int. Cl.$^6$ ............................................. C01G 23/047
[52] U.S. Cl. ................................................................ 423/613
[58] Field of Search ............................. 423/613, 495, 423/614; 106/437

[56] References Cited

U.S. PATENT DOCUMENTS

| | | | |
|---|---|---|---|
| 2,790,704 | 4/1957 | Lewis | 423/614 |
| 3,208,866 | 9/1965 | Lewis et al. | 423/612 |
| 3,214,284 | 10/1965 | Wilson | 423/613 |
| 3,382,042 | 5/1968 | Richardson et al. | 423/613 |
| 3,434,799 | 3/1969 | Wilson | 423/613 |
| 3,446,579 | 5/1969 | Toomey et al. | 423/495 |
| 3,505,091 | 4/1970 | Santos | 423/613 |
| 3,725,526 | 4/1973 | Pieri et al. | 423/613 |
| 3,734,761 | 5/1973 | Becker et al. | 423/613 |
| 3,966,892 | 6/1976 | Okudaira et al. | 423/613 |
| 4,803,056 | 2/1989 | Morris et al. | 423/613 |

FOREIGN PATENT DOCUMENTS

| | | |
|---|---|---|
| 1359420 | 3/1964 | France . |
| 2443423 | 8/1980 | France . |
| 392004 | 10/1973 | U.S.S.R. . |
| 805572 | 12/1958 | United Kingdom . |
| 991318 | 5/1965 | United Kingdom . |
| 1064569 | 4/1967 | United Kingdom . |
| 1097764 | 1/1968 | United Kingdom . |
| 1188210 | 4/1970 | United Kingdom . |
| 1211912 | 11/1970 | United Kingdom . |
| 1339784 | 12/1973 | United Kingdom . |
| 2037266 | 7/1980 | United Kingdom . |

OTHER PUBLICATIONS

Abstract of Soviet Union document 392,004, Oct. 30 1973.

*Primary Examiner*—Steven Bos
*Attorney, Agent, or Firm*—Baker & Botts, L.L.P.

[57] ABSTRACT

A novel process for the preparation of titanium dioxide comprises reacting titanium tetrachloride with oxygen at an elevated pressure and a temperature above 700° C. The titanium tetrachloride is introduced into the reactor in at least two points and that portion introduced in the first inlet point is admixed with aluminium chloride and has been heated to a temperature of at least 450° C. by utilizing the heat of reaction of aluminium and chlorine. The process provides an energy efficient method for producing titanium dioxide and avoids the need for auxiliary heating of the reactor by, for example, hydrocarbon combustion or electric discharge, which auxiliary heating can introduce impurities into the product titanium dioxide.

20 Claims, No Drawings

5,599,519

OXIDATION OF TITANIUM TETRACHLORIDE TO FORM TITANIUM DIOXIDE

This application is a continuation of application Ser. No. 08/102,791, filed Aug. 6, 1993 now abandoned.

FIELD OF THE INVENTION

This invention relates to the oxidation of titanium tetrachloride and in particular to the vapour phase oxidation of titanium tetrachloride to form pigmentary titanium dioxide.

BACKGROUND OF THE INVENTION

It is well-known that titanium tetrachloride reacts with oxygen in the vapour phase to form titanium dioxide and that this reaction is initiated by heating the reactants to a suitable temperature. However hot titanium tetrachloride is highly corrosive and therefore many useful materials of construction for heat exchangers used to heat titanium tetrachloride are rapidly corroded. In practice this generally imposes an upper limit of about 400° C. on the temperature to which titanium tetrachloride can be heated by conventional heat exchangers.

A suitable temperature for the reactants (oxygen and titanium tetrachloride) is about 900° C. and, in order to achieve this temperature in known processes, the oxygen feed must be heated sufficiently to compensate for the above-mentioned relatively low titanium tetrachloride temperature. Frequently this high temperature for the oxygen feed is achieved by adding a fuel such as toluene to the oxygen as it is introduced into the oxidation reactor or by heating with an electrical discharge. However, the use of these methods of heating introduces unwanted impurities such as, for example, carbonaceous residues from the fuel or metallic impurities from the electrodes used for the electrical discharge.

Furthermore, the oxidation of titanium tetrachloride is exothermic and therefore higher temperatures than are desirable can result in the reactor, leading to a waste of energy.

SUMMARY OF THE INVENTION

It is an object of this invention to provide a process for the oxidation of titanium tetrachloride in which the necessary temperature of reaction can be readily achieved and controlled without the need for the use of an auxiliary fuel or for heating by an electrical discharge.

One embodiment of the invention is directed to a process for the production of titanium dioxide. Titanium tetrachloride is reacted with oxygen at a pressure above atmospheric pressure and at a temperature of at least 700° C. in an oxidation reactor. Titanium tetrachloride is introduced into the reactor at a first inlet port and at least one further inlet port. Titanium tetrachloride at the first inlet port is mixed with aluminum chloride which is formed by the reaction of aluminum and chlorine. The heat generated by this reaction is used to heat the titanium tetrachloride introduced at the first inlet port to a temperature of at least 450° C.

DESCRIPTION OF THE INVENTION

According to the invention a process for the production of titanium dioxide comprises reacting titanium tetrachloride with oxygen at a pressure above atmospheric pressure and at a reaction temperature of at least 700° C. in an oxidation reactor, the titanium tetrachloride being introduced into the reactor at a first inlet point and at least one further inlet point, the titanium tetrachloride introduced at the first inlet point being in admixture with aluminium chloride and being heated to a temperature of at least 450° C., the aluminium chloride being formed by reaction of aluminium and chlorine and the heat generated by this reaction being used to heat the titanium tetrachloride introduced at the first inlet point.

Generally, the further inlet points will be positioned such that the titanium tetrachloride is added to the reaction stream at a point where any previously added titanium tetrachloride has been substantially completely oxidised. This enables the titanium tetrachloride which is added at the further inlet points to be at a lower temperature than that added at the first inlet point since the temperature necessary to initiate reaction is provided by the heat of reaction of the previously added titanium tetrachloride.

Oxygen is introduced into the oxidation reactor as an oxidising gas stream which may comprise a gas containing a relatively low proportion of oxygen such as air but may also be substantially pure oxygen or another gas mixture such as oxygen-enriched air.

The oxidising gas stream is usually preheated before introduction into the reactor to a temperature between 600° C. and 1200° C., preferably between 800° C. and 1000° C. Any suitable means can be used to achieve this temperature but the gas stream is conveniently heated by passing it through a hollow metal coil which is externally heated by a gas flame.

Titanium tetrachloride is introduced into the reactor at two or more inlet points. The temperature of the titanium tetrachloride introduced at the first inlet point is at least 450° C., is preferably between 450° C. and 650° C. and, most preferably, is between 500° C. and 600° C. This temperature is achieved, at least in part, by utilising the heat of reaction of aluminium and chlorine which form aluminium chloride with which the titanium chloride is admixed. Typically, the titanium tetrachloride is first heated to a temperature between 350° C. and 400° C. by passing it through a hollow coil formed from a metal such as Inconel which is externally heated by a gas flame, and subsequently passed to an aluminium chloride generator where it is mixed with aluminium chloride and heated to the chosen reaction temperature.

A number of types of aluminium chloride generators can be used in the process of the invention. For example powdered aluminium with or without an inert particulate material can be fluidised in a reactor by the upward passage of reactant chlorine and/or an inert gas. Alternatively, aluminium can be introduced into a stream of chlorine gas in particulate form but not necessarily sufficiently finely divided to fluidise in the gas stream. A fixed bed of particulate aluminium can also be chlorinated by passing chlorine into the bed through numerous nozzles surrounding the bed. Other methods include passing chlorine over molten aluminium or feeding two lengths of aluminium wire into a reactor in which they serve as consumable electrodes, a discharge being maintained between these electrodes in the presence of chlorine.

The titanium tetrachloride is mixed with the aluminium chloride in such a way that the heat of reaction is used as a means of raising the temperature of the titanium tetrachloride. It may, for example, be passed into the aluminium chloride generator either separately or mixed with chlorine and may form part of the fluidising gas in a fluid bed reactor. Alternatively it may be mixed with the hot aluminium chloride close to the exit from the generator.

The temperature of the titanium tetrachloride added at the further inlet points will depend to some extent upon the proportion fed to the first or earlier inlet points and the temperature to which that proportion is heated. It is convenient, however, to heat all the titanium tetrachloride to be oxidised to a temperature of, say, between 350° C. and 400° C. and subsequently pass a proportion to the aluminium chloride generator and the remainder to one or more further inlet points.

The proportion of titanium tetrachloride which is introduced to the reactor at the first inlet point determines to some extent the conditions within the oxidation reactor and can therefore be a varied to control these conditions. Usually at least 15% by weight of the total titanium tetrachloride feed will be introduced at the first inlet point and preferably the proportion added at the first inlet point is 20 to 60% by weight of the total titanium tetrachloride feed. Most preferably the proportion is 25 to 50% by weight.

The quantity of oxidising gas stream introduced depends largely upon the proportion of oxygen present in the gas stream. There must be sufficient oxygen to fully oxidise the total amount of titanium tetrachloride introduced and usually there is more oxygen than is stoichiometrically needed. Typically, the oxidising gas stream will provide at least 5% by weight and preferably 10% by weight more oxygen than is required to completely oxidise the titanium tetrachloride.

The aluminium chloride is present in the titanium tetrachloride to act as a rutilisation agent, that is, to promote the formation of rutile titanium dioxide. Normally, the quantity of aluminium chloride used is sufficient to produce between 0.5 and 2.0% $Al_2O_3$ by weight in the product titanium dioxide. Preferably, the amount used produces from 0.8 to 1.5% $Al_2O_3$ by weight in the product titanium dioxide.

The process of this invention is operated at a pressure above atmospheric pressure. Preferably, the pressure in the reactor during oxidation is at least 0.15 MPa above atmospheric pressure and most preferably is between 0.2 MPa and 0.5 MPa above atmospheric pressure.

The distance between the first inlet point and a second inlet point and between any further inlet points is governed by the rate of feed of the oxidising gas stream and the titanium tetrachloride at the previous inlet points. As stated hereinbefore, ideally most of the titanium tetrachloride introduced at the first inlet point will be oxidised before the reactant gas stream reaches the zone of the reactor adjacent to the second inlet point. Hence the preferred distance can be calculated from a desirable residence time for the reactants which will depend upon the average temperature of the reactants.

If desired, additional temperature control can be achieved by cooling the reactor walls between inlet points. The cooling can be achieved by external cooling of the walls with, for example, water or by providing a gas purge through perforations in the reactor wall. When a gas purge is provided the gas used will generally be one which is inert to the reactants such as nitrogen or chlorine. Use of a gas purge provides the advantage that the purge gas flow helps to reduce fouling of the reactor walls but, generally, it is preferred to avoid cooling the reactor as this practice is wasteful of energy.

Usually, the reactors used for the process of this invention have a generally tubular shape and the oxidising gas flow is introduced at one end. The first inlet point is close to the end where the oxidising gas flow is introduced and the titanium tetrachloride is introduced through an injector of the type conventionally used for titanium tetrachloride oxidation reactors. For example, the injector may comprise a circumferential slot in the wall of the reactor, an arrangement of perforations in the reactor wall which may extend axially along the reactor, a single jet or nozzle or an arrangement of jets or nozzles. Generally the design of injectors used at the further inlet will be similar to those used at the first inlet point.

Any pipework and associated equipment used to conduct the mixture of titanium tetrachloride and aluminium chloride from the aluminium chloride generator to the first inlet point will usually be formed from a ceramics material to minimise corrosion. Corrosion of the reactor used for the process of the invention can also be reduced by constructing the first inlet point and the walls between the first inlet point and the second inlet point from a ceramics material.

Additives conventionally used in the oxidation of titanium tetrachloride can be used in the process of this invention. For example alkali metal salts may be added to control the crystal size of the titanium dioxide produce. Preferably the alkali metal salt is a potassium salt which can be added as potassium chloride to the oxidising gas stream before the first inlet point. The amount of potassium added may be up to 2000 ppm but preferably the amount added is from 0.5 to 20 ppm calculated as K with respect to $TiO_2$ formed. A scouring agent such as sand or titanium dioxide with a particle size much larger than pigmentary titanium dioxide can also be added to help prevent fouling of the reactor walls.

The invention provides an easily controllable process for the oxidation of titanium tetrachloride with minimum contamination of the product titanium dioxide and without the use of inflammable liquids such as toluene. The introduction of all the aluminium chloride with the titanium tetrachloride added at the first inlet point generally leads to easy rutilisation of the titanium dioxide formed.

The crystal size of the product titanium dioxide can also be adjusted by adjusting the temperature at the first inlet point and/or the pressure in the reactor.

The invention is illustrated by the following Examples.

EXAMPLE 1

A 50 mm diameter tubular reactor equipped with two annular slots each 1 mm wide with a distance of 100 mm between the slots was fed at one end with 4.4 moles/min of oxygen at a temperature of 900° C. A flow of 4 moles/min of titanium tetrachloride was preheated to 350° C. 1.3 moles/rain of this titanium tetrachloride was fed to a fluidised bed aluminium chloride generator which was fed with sufficient chlorine and aluminium to produce 1% $Al_2O_3$ with respect to $TiO_2$ in the final product. This produced a temperature at the first slot after heat loss of 460° C. The remainder of the titanium tetrachloride flow was passed directly to the second slot. The space between the two slots was not purged but a short purge section 70 mm long was provided downstream of the second slot. This was fed with 1 mole/min of nitrogen at room temperature. The reactor was operated at a pressure of 0.3 MPa above atmospheric pressure. The product from this run was pigmentary $TiO_2$ in the rutile form.

EXAMPLE 2

The same reactor as in Example 1 was operated with the same amount of oxygen at 865° C. and the same amount of titanium tetrachloride to the first slot at a temperature of 540° C. The product from this run was pigmentary $TiO_2$ substantially in the rutile form.

I claim:

1. A process for the production of titanium dioxide comprising reacting titanium tetrachloride with oxygen in an oxidation reactor operated at a pressure of at least 0.2 MPa above atmospheric pressure and at a reaction temperature of at least 700° C., the titanium tetrachloride being introduced into the oxidation reactor at a first inlet point and at least one further inlet point, the titanium tetrachloride introduced at the first inlet point being in admixture with aluminum chloride and being heated to a temperature of between 450° C. and 650° C., the aluminum chloride being formed by reaction of aluminum and chlorine and the heat generated by this reaction being used to heat the titanium tetrachloride introduced at the first inlet point and wherein all of the aluminum chloride is introduced into the oxidation reactor at the first inlet point.

2. A process according to claim 1 in which the oxygen is preheated before introduction into the reactor to a temperature between 600° C. and 1200° C.

3. A process according to claim 2 in which the oxygen is preheated to a temperature between 800° C. and 1000° C.

4. A process according to claim 1 wherein all the titanium tetrachloride to be oxidized is preheated to a temperature between about 350° C. and about 400° C. and thereafter a portion of said preheated titanium tetrachloride is passed to an aluminum chloride reactor and from said aluminum chloride reactor to said first inlet point and a remainder of said preheated titanium tetrachloride is introduced into the oxidation reactor by means of said at least one further inlet point.

5. A process according to claim 1 in which the titanium tetrachloride is introduced at the first inlet point at a temperature between 500° C. and 600° C.

6. A process according to claim 1 in which the titanium tetrachloride is first heated to a temperature between 350° C. and 400° C. before being passed to an aluminium chloride generator.

7. A process according to claim 6 in which a portion of the titanium tetrachloride heated to a temperature between 350° C. and 400° C. is passed to an aluminium chloride generator and the remainder is passed to one or more further inlet points.

8. A process according to claim 1 in which the oxygen is introduced into the reactor as air or oxygen-enriched air.

9. A process according to claim 1 in which the aluminium and chlorine are reacted in a fluid bed reactor.

10. A process according to claim 9 in which titanium tetrachloride forms part of the fluidising gas in the fluid bed reactor.

11. A process according to claim 1 in which at least one of the inlet points comprises a circumferential slot in the wall of the reactor.

12. A process according to claim 1 in which at least 15 percent by weight of the titanium tetrachloride is introduced at the first inlet point.

13. A process according to claim 1 in which from 20 to 60 percent by weight of the titanium tetrachloride is introduced at the first inlet point.

14. A process according to claim 1 in which oxygen is used in an amount equivalent to at least 5 percent by weight more than is required to completely oxidise the titanium tetrachloride.

15. A process according to claim 1 in which the aluminium chloride is introduced in an amount sufficient to produce between 0.5 and 2.0 percent by weight $Al_2O_3$ in the product titanium dioxide.

16. A process according to claim 15 in which the amount of aluminium chloride is sufficient to produce from 0.8 to 1.5 percent by weight $Al_2O_3$ in the product titanium dioxide.

17. A process according to claim 1 in which the walls of the reactor are cooled.

18. A process according to claim 1 in which the pressure in the reactor is from 0.2 MPa to 0.5 MPa above atmospheric pressure.

19. A process according to claim 1 in which a potassium salt is added to the oxygen before the oxygen mixes with the titanium tetrachloride introduced at the first inlet point, the potassium salt being added in an amount equivalent to up to 2000 parts per million potassium by weight calculated as K with respect to the titanium dioxide product.

20. A process according to claim 19 in which the amount of potassium salt is equivalent to from 0.5 to 20 parts per million potassium by weight calculated as K with respect to titanium dioxide product.

* * * * *